June 10, 1952  A. WITTLIN  2,600,148

LIQUID CIRCULATION INDICATOR

Filed May 3, 1950

INVENTOR.
Albert Wittlin
BY
Banning & Banning
Attys

Patented June 10, 1952

2,600,148

UNITED STATES PATENT OFFICE 2,600,148

LIQUID CIRCULATION INDICATOR

Albert Wittlin, Chicago, Ill.

Application May 3, 1950, Serial No. 159,799

4 Claims. (Cl. 116—117)

This invention relates to an indicator adapted to be interposed in a circulatory system whereby to reveal not only the presence of a fluid passing therethrough, but also in many cases its condition as well. This indicator has numerous advantages in the direction of simplicity, strength, proof against leakage, and breakage. It comprises a pair of oppositely disposed arcuate transparent panels each carried in a wholly unstressed condition in a floating mounting which maintains it out of contact with the supporting tubular housing, whereby to receive enhanced protection during assembly, installation, and also changing thermal conditions.

The present indicator has been designed with special reference to refrigerator systems wherein a refrigerant is required to be circulated through a line. It is important that there be no obstruction or restriction interposed to the free movement of fluid through the indicator which, for this purpose, is of the straight-through type. In addition, the indicator is provided with an enlarged elongated housing which permits installation therewith of glass panels of enhanced area through which a clearer view may be gained of the fluid circulating through the indicator. The construction is such that the indicator housing need be furnished in but two or three sizes in order to couple with end fittings of widely varying sizes as required by the tubing in the refrigerating line with which connection is made. This is of advantage since it minimizes the inventory which is required for indicator housings which are appropriate to many different installations.

An important objective of this invention is to provide a floating mounting for the glass panels, such that they may remain unstressed and be free to shift longitudinally or radially in response to vibrations or other forces which may impose special stresses thereupon. It is important also that such a mounting be fluid-tight, and remain so, in the face of widely varying thermal conditions, sometimes ranging through 100° or more and of pressures ranging from perhaps 100 to 250 lbs. per sq. inch with vibrations and pulsations ever present. All these special conditions have been satisfactorily met by the improved construction of the present indicator which involves a manufacturing cost considerably less than for comparable devices heretofore known and used.

A suggestive embodiment of this indicator is set forth in the accompanying drawing wherein—

Figure 1:
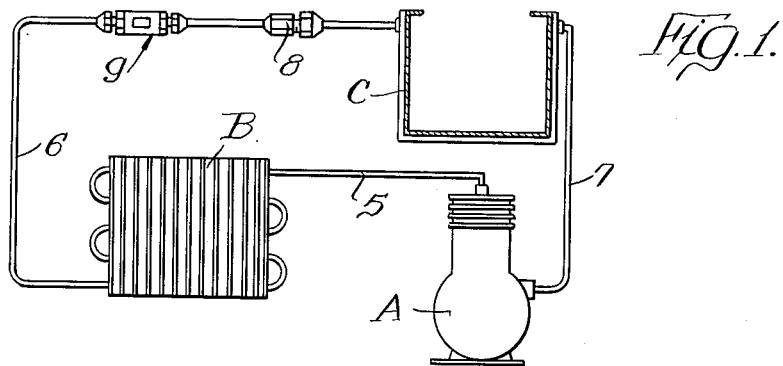
Figure 1 is a diagrammatic view of a refrigeration system incorporating the usual operating units and also the indicator of this invention.

In the showing of Fig. 1 there is a compressor A from which a refrigerant is pumped under pressure through a line of tubing 5 to a condenser B. A tubing line 6 extends from the condenser through an evaporator C and from thence another line of tubing 7 leads back to the compressor. A fluid flow regulator 8 is desirably included in the system. The indicator of the present invention, designated as 9, is also interposed in the system at any convenient point.

The present indicator comprises three principal parts, viz. an elongated tubular housing H and at each end thereof a head 10 having an axially extended nipple 11 which is threaded exteriorly to receive a coupling 12 whereby to establish connection with the circulatory line of a refrigerating system or the like.

Each nipple head is desirably formed with an annular ring 15 which extends toward one end of the tubular housing H wherein is a circular seat 16 surrounded by a wall 17. The seat 16 is arranged to receive the annular ring 15 which, when advanced thereinto is required to engage tightly with the wall 17, as with a pressed fit. In this manner, the two head fittings may be joined inseparably to the housing so as to constitute therewith a unit that is fluid-tight.

Figure 2:
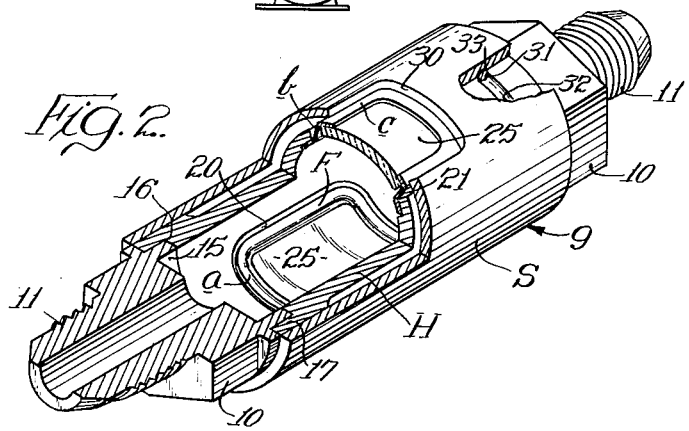
Fig. 2 is a view in perspective of the indicator per se, partly broken away to exhibit certain of the parts in section.
Figure 3:
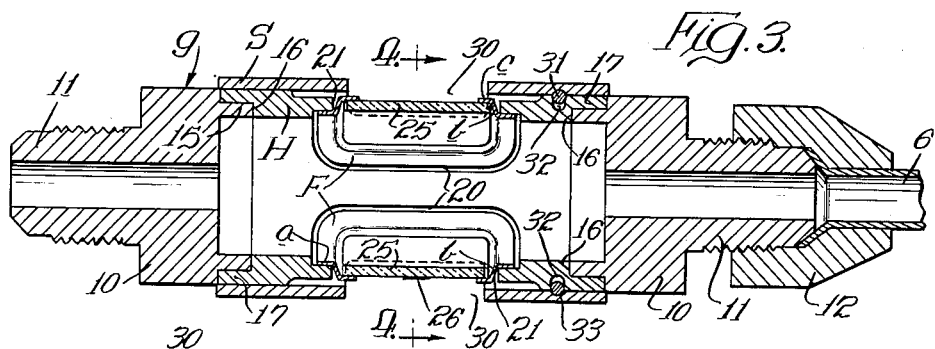
Fig. 3 is a central longitudinal section through the indicator in its entirety.

The housing is provided on its interior with a pair of oppositely disposed shallow recesses 20 each extending through an arcuate distance of perhaps 60°. Throughout the major part of each recess, the housing wall is cut away to provide a window opening 21, leaving the recess as a shallow border which extends around this opening. The window openings 21 are located diametrically opposite each other, as clearly shown in Fig. 3 of the drawings, and they are also circumferentially spaced from each other, as clearly shown in Fig. 2 of the drawings.

Through each window opening thus provided is extended a frame F having an ogee cross section. As herein shown, the frame is foursided with curved corners. The outer section a of this frame is extended inwardly of the housing to engage its interior face within the confines of the recess 20 where it is secured through a sealing and inseparable connection produced as by brazing. The intermediate section b of the ogee frame extends angularly through the window opening 21 adjacent its margins to position its outer section c substantially flush with the curved outer face of the housing. The frame, it will be noted, has two long sides that are straight, and two shorter sides that are curved concentrically with the walls of the housing H. The outer section c of the frame is adapted to engage the outer face of an arcuate transparent panel 25 which may be formed of glass or other suitable material to which it is secured by a sealing and inseparable connection produced as by cement or by brazing. As a suitable material for the panel, a boro silicate glass is suggested.

The housing H provides a straight-through passageway with no interference whatever offered to the moving fluid. The two transparent panels 25 lie oppositely of each other so that an inspection through either of them will reveal the presence of fluid moving through the housing, as well as its condition. Desirably a mark such as a dot or line 26 is carried on one of the two transparent panels so that when an inspection is made through the panel opposite thereto the dot or line will appear magnified or distorted, according to the nature and condition of the fluid which is then circulating through the housing.

The ogee frame by which each window is mounted within the housing is desirably endless and produced from a suitable alloy having spring properties in the requisite degree, and also a coefficient of expansion which approximates that of the material used for the transparent panel. For this purpose phosphor bronze is suggested. As a result, the connection between such a frame and the panel will remain fluid-tight in the presence of widely fluctuating pressures and thermal changes, and the same is true of the connection between such a frame and the housing of the indicator which is commonly produced from brass. Furthermore, this frame provides for the transparent panel a mounting which is full floating in that the panel is free, while in an unstressed state, to move radially, longitudinally, or circumferentially within the window opening 21 in response to any stresses that may be imposed. As a result, the fluid-tight joints established by each frame with its supported panel and also with the supporting housing will continue to remain so under all the usual rigorous service conditions which are encountered.

Figure 4:
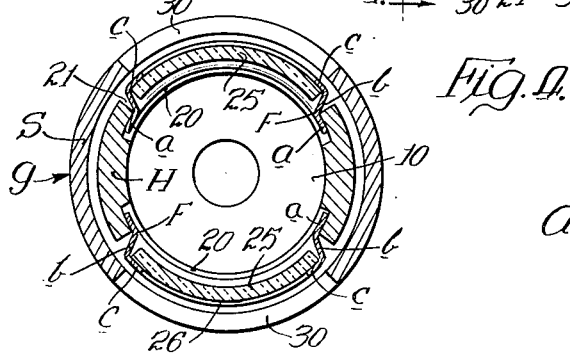
Fig. 4 is a transverse section through the indicator, taken on line 4—4 of Fig. 3.

As an added feature which may optionally be used, I have shown a hollow cylindrical shell S which is fitted around the housing for substantially its entire length. This shell is formed with a pair of window openings 30 at opposite points, each such opening being substantially the same in size, area, and position as one of the transparent panels 25. The shell may be secured rotatably in place as by means of a split spring ring 31 which is received within a deep groove 32 extending circumferentially around the housing near one end thereof, the ring also being maintained by its own expansive force within a shallow groove 33 on the interior of the shell. By rotating the shell to the position shown in Fig. 4 both the transparent panels are fully exposed, whereas they are covered over substantially completely when the shell is rotated therefrom through a distance of 90° in either direction. The advantage of this is that the two transparent panels are fully protected from damage when the shell is in closed position, so that carelessness of a workman will not produce any breakage or loosening of either panel. When rotated to the exposed position of Fig. 4, however, the borders of the window openings 30 in the shell provide in effect a shadow box exteriorly of the transparent panel 25 so as to improve the vision therethrough. The split spring ring 31 acts as a detent to hold the shell in a selected rotative position and also to maintain the shell in assembled relation with the housing, but may yield in response to a sufficient force to permit removal of the shell from the housing by an endwise movement of one relative to the other.

I claim:

1. For interposition in a fluid circulatory system, an indicator comprising an elongated tubular housing having window openings at substantially opposite points and circumferentially spaced from each other, an arcuate transparent panel positioned within each window opening to occupy space wholly within the confines thereof, a transversely ogee frame of resilient material surrounding each panel and having its outer marginal portions engaged therewith upon the outer convex face thereof and extending between its margins and those of the surrounding window opening and having its inner marginal portions engaged with the inner concave face of the housing, the frame being affixed by sealing connections with the panel and with the housing at its points of engagement therewith, said frame having between the affixed connections an intermediate resilient portion spaced from the housing and the panel and extending entirely around the panel and providing for the panel a fluid-tight floating mounting within the window opening of the housing.

2. For interposition in a fluid circulatory system, an indicator comprising an elongated tubular housing having in one side a four-sided window opening, a transparent panel positioned within the window opening wholly within the confines thereof and spaced from each of its margins, and a four-sided resilient frame extended continuously around within the marginal space to the outside of the panel and engaged with its outer face adjacent its margins and also engaged with the interior face of the housing adjacent the margins of its window opening and in sealing connection with both the panel and housing, said frame having between the sealing connections an intermediate resilient portion spaced from the housing and the panel and extending entirely around the panel and providing a fluid-tight floating mounting for the transparent panel in the housing.

3. For interposition in a fluid circulatory system, an indicator comprising an elongated tubular housing having in one side a window opening, a transparent panel positioned within the opening in spaced relation thereto, and a resilient frame surrounding the panel and in sealing connection therewith and with the housing, said frame having between its sealing connections an intermediate resilient section extending entirely around the panel and spaced from the same and from the housing and supporting the panel in an unstressed condition and providing therefor a fluid-tight floating mounting within the window opening of the housing.

4. For interposition in a fluid circulatory system, an indicator comprising an elongated tubular housing having end portions of uniform outside diameter and provided in one side thereof with a window opening, a transparent panel positioned within the window opening within the confines of a cylinder coradial and concentric with the end portions of the housing, means supported by the housing supporting the panel and providing therefor a floating mounting, a cylindrical shell having an inside diameter substantially the same as the outside diameter of the end portions of the housing and interfitted rotatively therewith, the shell being provided in one side with a window opening substantially the same in size, area, and location as the transparent panel in the housing, and means for releasably holding the shell against endwise movement relative to the housing comprising a spring detent carried by one and in yielding pressure engagement with the other, said means serving also to frictionally lock the shell in a selected position of rotative adjustment relative to the housing.

ALBERT WITTLIN.

REFERENCES CITED

The following references are of record in the file of this patent:

UNITED STATES PATENTS

| Number | Name | Date |
| --- | --- | --- |
| 291,296 | Colby | Jan. 1, 1884 |
| 1,042,730 | Walquist | Oct. 29, 1912 |
| 1,608,369 | Campbell | Nov. 23, 1926 |
| 2,050,576 | Kronquest | Aug. 11, 1936 |
| 2,075,477 | Smith | Mar. 30, 1937 |